(12) United States Patent
Pasqualini

(10) Patent No.: US 6,981,013 B1
(45) Date of Patent: Dec. 27, 2005

(54) LOW POWER, MINIMAL AREA TAP MULTIPLIER

(75) Inventor: Ronald Pasqualini, Los Altos, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 542 days.

(21) Appl. No.: 09/963,042

(22) Filed: Sep. 24, 2001

(51) Int. Cl.[7] ............................................. G06F 7/52
(52) U.S. Cl. .................................................. 708/625
(58) Field of Search ........................................ 708/625

(56) References Cited

U.S. PATENT DOCUMENTS

| | | | | |
|---|---|---|---|---|
| 4,941,121 A | * | 7/1990 | Zurawski | 708/625 |
| 5,126,964 A | * | 6/1992 | Zurawski | 708/625 |
| 5,231,601 A | * | 7/1993 | Stearns | 708/625 |
| 5,442,579 A | * | 8/1995 | Thomson | 708/628 |
| 6,684,236 B1 | * | 1/2004 | Farnbach | 708/628 |

* cited by examiner

Primary Examiner—D. H. Malzahn
(74) Attorney, Agent, or Firm—Mark C. Pickering

(57) ABSTRACT

A low power tap multiplier multiplies a m-bit multiplier and a n-bit multiplicand to output a p-bit multiplication product. The p-bit product is one bit more than the n-bit multiplicand when the multiplicand is symmetric, and two bits more when the multiplicand is non-symmetric. Since the low power tap multiplier utilizes a minimal number of small unstacked transistors, it consumes less power and requires less silicon area.

22 Claims, 7 Drawing Sheets

LOW POWER, MINIMAL AREA TAP MULTIPLIER

BACKGROUND OF THE INVENTION

1. Field of the Invention

The present invention relates to a low power tap multiplier which consumes minimal chip area.

2. Description of the Related Art

Almost all digital signal processor (DSP) applications require the use of multipliers. These multipliers are used to perform a variety of tasks, including the implementation of digital filters. The digital filter equations often take the form shown in EQ. 1:

$$\text{Filter output} = \sum_{i=0}^{n} C_i D_{(i-k)} \qquad \text{EQ. 1}$$

where $C_i$ are the filter coefficients, $D_i$ are the input data samples, and k is the data delay.

One problem with conventional tap multipliers is that they consume a significant amount of power and a significant amount of silicon area. Thus there is a need for a tap multiplier which consumes less power and requires less silicon area for implementation.

SUMMARY OF THE INVENTION

The present invention comprises a tap multiplier which multiplies a m-bit multiplier and a n-bit multiplicand to output a p-bit multiplication product. Without decreasing operating speed, the tap multiplier employs fewer, smaller size CMOS transistors. As a result, the tap multiplier consumes less power and requires less silicon area for implementation.

A multiplier in accordance with the present invention includes a multiply controller which decodes the m-bit multiplier and outputs a plurality of control signals in response thereto. The multiplier also includes a plurality of bit slices that are connected to the multiply controller. Each bit slice has a plurality of processing blocks and an adder that is connected to the processing blocks. Each processing block within a bit slice is connected to a control signal. A processing block within the bit slice is also connected to a bit of the n-bit multiplicand. The adder in the bit slice outputs one bit of the p-bit multiplication product.

A better understanding of the features and advantages of the present invention will be obtained by reference to the following detailed description and accompanying drawings that set forth an illustrative embodiment in which the principles of the invention are utilized.

DETAILED DESCRIPTION

Figure 1:
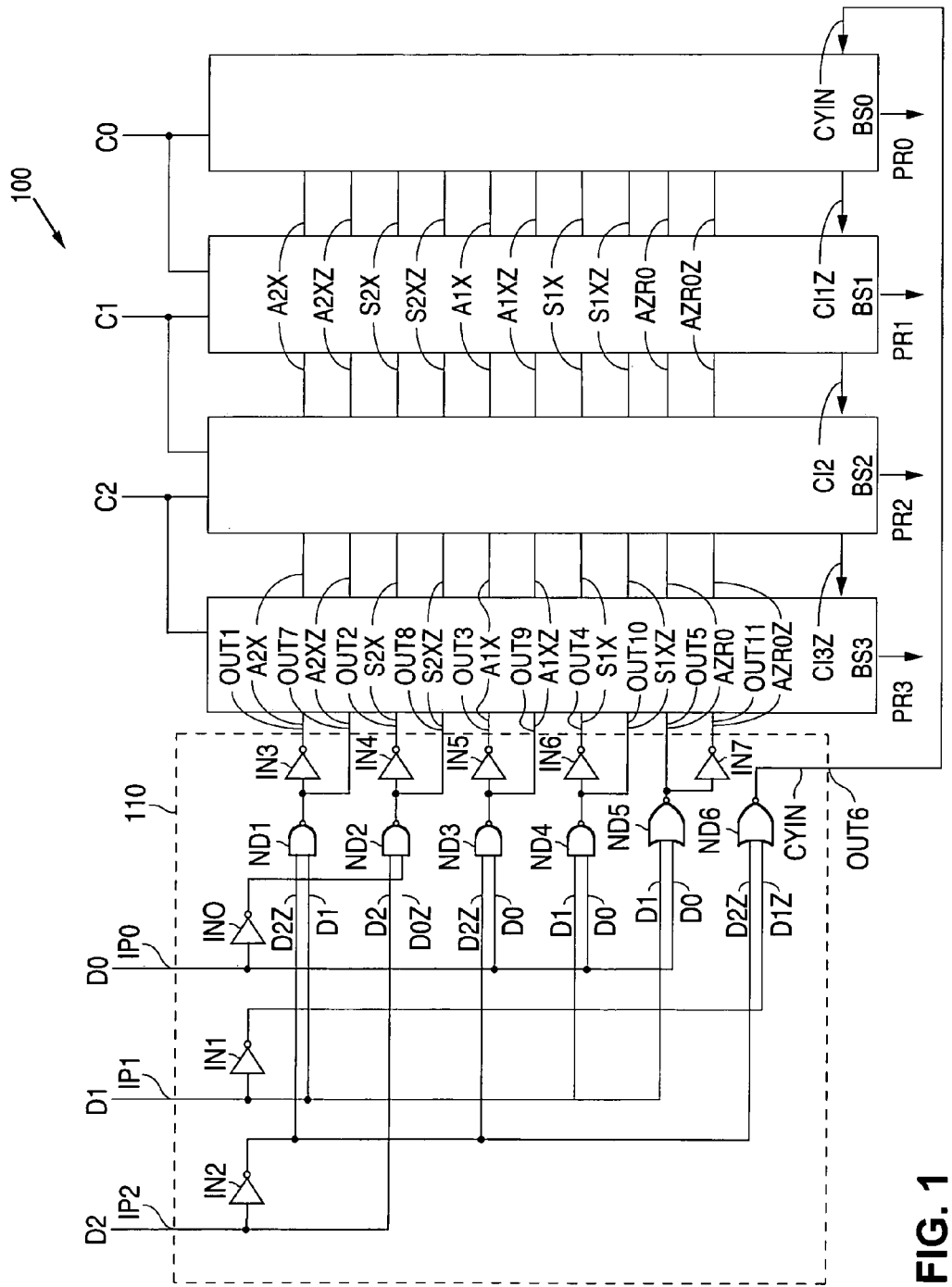
FIG. 1 is a schematic illustrating a low power, minimum area tap multiplier 100 for use with a symmetric multiplicand in accordance with the present invention.

In certain applications, the multiplication process in EQ. 1 can be simplified by restricting the input data samples $D_i$ to a limited range of "tractable" values. For example, in gigabit Ethernet physical-layer (phy) chips, the input data samples $D_i$ are limited to the following five values: +2, +1, 0, −1, −2. These five values, in turn, can be represented by three binary bits in two's complement format.

In two's complement format, the most significant bit represents a negative value when the logic state of the bit is high. Thus, for example, the three-bit value 111 represents −1 in two's complement format. The left-most bit represents −4 (rather than positive four), the middle bit +2, and the right-most bit +1. Summing these together yields −1.

Referring to EQ 1, the input data samples $D_i$ are regarded as the multiplier and the filter coefficients $C_i$ are regarded as the multiplicand. As shown in TABLE 1, the multiplication product depends upon the multiplier, and is obtained by one of five operations. These 5 operations include: 1) setting the multiplicand to zero and then adding it to zero, 2) adding the multiplicand to zero, 3) left-shifting the multiplicand and adding the result to zero, 4) subtracting the multiplicand from zero, 5) left-shifting the multiplicand and subtracting the result from zero.

TABLE 1

| Decimal Multiplier Value | Binary Multiplier Value | Operation Required to Obtain the Multiplication Product |
|---|---|---|
| 0 | 000 | Set multiplicand to zero and add to zero |
| +1 | 001 | Add the multiplicand to zero |
| +2 | 010 | Left shift the multiplicand and add to zero |
| −1 | 111 | Subtract the multiplicand from zero |
| −2 | 110 | Left shift the multiplicand and subtract from zero |
| +3 | 011 | Unused (don't care) |
| −3 | 101 | Unused (don't care) |
| −4 | 100 | Unused (don't care) |

The subtraction operations listed in TABLE 1 can be implemented by performing an addition operation using the one's complement of the multiplicand, with the input carry forced to one. For example, when minus one is subtracted from zero $((0)-(-1)=(+1)$ or, in binary, $(000)-(111)=(001))$, the minus one is inverted so that the multiplicand (111) becomes (000), the carry is forced to one, and the subtraction operation is converted into an addition operation.

Thus, to implement the operations listed in TABLE 1, five control signals are required and, due to the one's complement subtraction operation, an input carry signal is also required. These signals are summarized in TABLE 2:

TABLE 2

| Multiply Control Signal | Operation Performed |
| --- | --- |
| A2X | Left shift the multiplicand and add to zero |
| S2X | Left shift the multiplicand and subtract from zero |
| A1X | Add the multiplicand to zero |
| S1X | Subtract the multiplicand from zero |
| AZRO | Set multiplicand to zero and add to zero |
| CYIN | Force the LSB input carry to one |

In order to generate the six signals shown in TABLE 2, the three "don't care" cases shown in TABLE 1 can be used to considerably simplify decoding of the three multiplier bits (D2, D1, D0). As shown in TABLE 3, the six signals can be generated with only six gates, each of which has only two inputs.

TABLE 3

$$A2X = \sim D2 \cdot D1$$
$$S2X = D2 \cdot \sim D0$$
$$A1X = \sim D2 \cdot D0$$
$$S1X = D1 \cdot D0$$
$$AZRO = \sim D1 \cdot \sim D0$$
$$CYIN = D2 \cdot D1$$

(The "~" prefix indicates a complemented variable)

The number of bits in the multiplier product depends upon the range of coefficient values in the multiplicand ($C_i$ in EQ. 1). When the coefficient values $C_i$ are symmetric, the product contains only one more bit than the multiplicand. For example, assuming that the coefficient values $C_i$ are symmetric four-bit numbers ranging from −7 to +7, the product will contain five bits, ranging in value from −14 to +14.

When the coefficient values $C_i$ are non-symmetric, the product contains two more bits than the multiplicand. For example, assuming that the coefficient values $C_i$ are non-symmetric four-bit numbers ranging from −8 to +7, the product will contain six bits, ranging in value from −16 to +16. With non-symmetric values, an extra product bit is required in order to accommodate the multiplication case $(-2)X(-8)= +16$.

In accordance with the present invention, FIG. 1 shows the schematic of a low power, minimal area tap multiplier 100 for use with a symmetric multiplicand. Referring to FIG. 1, tap multiplier 100 includes a multiply controller 110 which decodes the three multiplier bits D0, D1, and D2. As shown in FIG. 1, multiply controller 110 generates the six control signals (A2X, S2X, A1X, SIX, AZRO, CYIN) shown in TABLE 2.

Data signals D0–D2 are received on data inputs IP0, IP1 and IP2, respectively, while the control signals (A2X, S2X, A1X, S1X, AZRO and CYIN) from TABLE 2 are generated on outputs OUT1–OUT6, respectively. Furthermore, controller 110 also generates the complements of the control signals (A2XZ, S2XZ, A1XZ, S1XZ, and AZROZ) on outputs OUT7–OUT11, respectively.

As shown in FIG. 1, multiply controller 110 includes three inverters IN0–IN2 which are connected to inputs IP0–IP2, respectively, generating the inverted data signals D0Z, D1Z, and D2Z. Controller 110 also includes six logic blocks which are connected to receive the data signals D0–D2 and the inverted data signals D0Z–D2Z.

The first logic block includes a NAND gate ND1 which receives data signals D2Z and D1, and generates control signal A2XZ. The first logic block also includes an inverter IN3 connected to the output of NAND gate ND1, generating an output control signal A2X. Thus, gates ND1 and IN3 implement the equation for A2X in the first row of TABLE 3.

The second logic block includes a NAND gate ND2 which receives data signals D2 and D0Z, and generates control signal S2XZ. The second logic block also includes an inverter IN4 connected to the output of NAND gate ND2, generating an output control signal S2X. Thus, gates ND2 and IN4 implement the equation for S2X in the second row of TABLE 3.

The third logic block includes a NAND gate ND3 which receives data signals D2Z and D0, and generates control signal A1XZ. The third logic block also includes an inverter IN5 connected to the output of NAND gate ND3, generating an output control signal A1X. Thus, gates ND3 and IN5 implement the equation for A1X in the third row of TABLE 3.

The fourth logic block includes a NAND gate ND4 which receives data signals D1 and D0, and generates control signal S1XZ. The fourth logic block also includes an inverter IN6 connected to the output of NAND gate ND4, generating an output control signal S1X. Thus, gates ND4 and IN6 implement the equation for S1X in the fourth row of TABLE 3.

The fifth logic block includes a NOR gate ND5 which receives data signals D1 and D0, and generates control signal AZRO. The fifth logic block also includes an inverter IN7 connected to the output of NOR gate ND5, generating an output control signal AZROZ. Thus, gates ND5 and IN7 implement the equation for AZRO in the fifth row of TABLE 3.

The sixth logic block includes a NOR gate ND6 which receives data signals D2Z and D1Z, and generates control signal CYIN. Thus, gate ND6 implements the equation for CYIN in the sixth row of TABLE 3.

As further shown in FIG. 1, multiplier 100 also includes four bit slices BS0–BS3 which operate on the logic states of three coefficient (multiplicand) bits C0–C2 in response to the control signals A2X, S2X, A1X, S1X, AZRO, A2XZ, S2XZ, A1XZ, S1XZ, AZROZ and CYIN. As noted above, the number of bit slices BS used in a particular application is determined by two factors: the number of bits in the multiplicand and whether or not the multiplicand is symmetric. In the example shown in FIG. 1, there are three bits in the multiplicand represented by the three coefficient signals C0–C2. Furthermore, the coefficient values are symmetric.

When the coefficient values are symmetric, the product contains only one more bit than the multiplicand. Thus, in the example shown in FIG. 1, four bit slices BS0–BS3 are used when three symmetric coefficient (multiplicand) bits C0–C2 are utilized. As a result, tap multiplier 100 includes one least significant bit slice (BS0), one odd numbered bit slice (BS1), one even numbered bit slice (BS2) and one most significant bit slice (BS3). In order to accommodate multiplicands which have additional bits, additional odd and/or even bit slices must be used. However, no matter how many odd/even bit slices are present, there will always be only one least significant bit slice and only one most significant bit slice.

Figure 2:
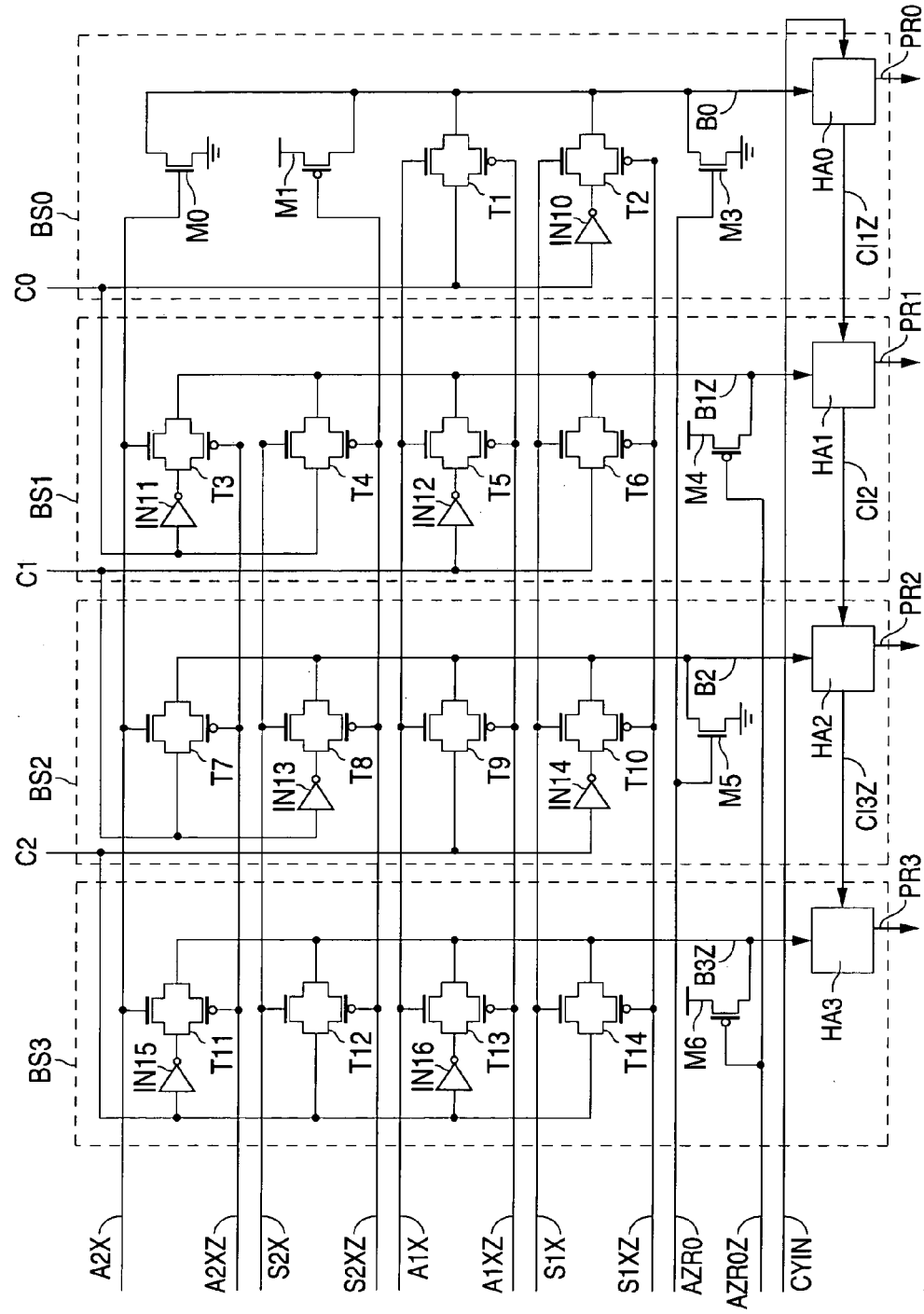
FIG. 2 is a schematic diagram illustrating bit slices BS0–BS3 in accordance with the present invention.

In accordance with the present invention, FIG. 2 shows the schematic diagram for bit slices BS0–BS3. Referring to FIG. 2, least significant bit slice BS0 includes an n-channel transistor M0 which has a source connected to ground, a drain connected to an active high output line B0, and a gate connected to output OUT1 of controller 110, receiving the output signal A2X. Bit slice BS0 also includes a p-channel transistor M1 which has a source connected to a power supply voltage, a drain connected to active high output line B0, and a gate connected to output OUT8 of controller 110, receiving the output signal S2XZ.

Bit slice BS0 further includes a transmission gate T1 which has an input connected to receive coefficient bit C0, and an output connected to active high output line B0. Transmission gate T1 also has an n-channel gate connected to receive control signal A1X and a p-channel gate connected to receive control signal A1XZ.

Furthermore, bit slice BS0 also includes an inverter IN10 and a transmission gate T2. Inverter IN10 has an input connected to receive coefficient bit C0 and an output, while transmission gate T2 has an input connected to the output of inverter IN10 and an output connected to active high output line B0. Transmission gate T2 also has an n-channel gate connected to receive control signal S1X and a p-channel gate connected to receive control signal S1XZ.

Bit slice BS0 further includes an n-channel transistor M3 which has a source connected to ground, a drain connected to active high output line B0, and a gate connected to output OUT5 of controller 110, receiving the output signal AZRO. Bit slice BS0 also includes a half adder HA0 which adds the logic state on the active high output line B0 to the logic state on the active high input carry signal CYIN. Half adder HA0, which is a type of adder, also generates an active high sum output PR0 and an active low carry output CI1Z.

Odd bit slice BS1 includes an inverter IN11 and a transmission gate T3. Inverter IN11 has an input connected to receive coefficient bit C0 and an output, while transmission gate T3 has an input connected to the output of inverter IN11 and an output connected to an active low output line B1Z. Furthermore, transmission gate T3 has an n-channel gate connected to receive control signal A2X and a p-channel gate connected to receive control signal A2XZ.

Bit slice BS1 also includes a transmission gate T4 which has an input connected to receive coefficient bit C0, and an output connected to active low output line B1Z. Transmission gate T4 also has an n-channel gate connected to receive control signal S2X and a p-channel gate connected to receive control signal S2XZ.

Furthermore, bit slice BS1 also includes an inverter IN12 and a transmission gate T5. Inverter IN12 has an input connected to receive coefficient bit C1 and an output, while transmission gate T5 has an input connected to the output of inverter IN12 and an output connected to active low output line B1Z. Transmission gate T5 also has an n-channel gate connected to receive control signal A1X and a p-channel gate connected to receive control signal A1XZ.

Bit slice BS1 also includes a transmission gate T6 which has an input connected to receive coefficient bit C1, and an output connected to active low output line B1Z. Transmission gate T6 also has an n-channel gate connected to receive control signal S1X and a p-channel gate connected to receive control signal S1XZ.

Furthermore, bit slice BS1 also includes a p-channel transistor M4 which has a source connected to the power supply voltage, a drain connected to active low output line B1Z, and a gate connected to output OUT11 of controller 110, receiving the output signal AZROZ. Bit slice BS1 also includes a half adder HA1 which adds the logic state on the active low output line B1Z to the logic state on the active low carry input signal CI1Z. Half adder HA1, which is a type of adder, also generates an active high sum output PR1 and an active high carry output CI2.

Even bit slice BS2 includes a transmission gate T7 which has an input connected to receive coefficient bit C1, and an output connected to an active high output line B2. Furthermore, transmission gate T7 also has an n-channel gate connected to receive control signal A2X and a p-channel gate connected to receive control signal A2XZ.

Bit slice BS2 also includes an inverter IN13 and a transmission gate T8. Inverter IN13 has an input connected to receive coefficient bit C1 and an output, while transmission gate T8 has an input connected to the output of inverter IN13 and an output connected to active high output line B2. Transmission gate T8 also has an n-channel gate connected to receive control signal S2X and a p-channel gate connected to receive control signal S2XZ.

Bit slice BS2 also includes a transmission gate T9 which has an input connected to receive coefficient bit C2, and an output connected to active high output line B2. Transmission gate T9 has an n-channel gate connected to receive control signal A1X and a p-channel gate connected to receive control signal A1XZ.

Furthermore, bit slice BS2 includes an inverter IN14 and a transmission gate T10. Inverter IN14 has an input connected to receive coefficient bit C2 and an output, while transmission gate T10 has an input connected to the output of inverter IN14 and an output connected to active high output line B2. Transmission gate T10 also has an n-channel gate connected to receive control signal S1X and a p-channel gate connected to receive control signal S1XZ.

Furthermore, bit slice BS2 also includes an n-channel transistor M5 which has a source connected to ground, a drain connected to active high output line B2, and a gate connected to output OUT5 of controller 110, receiving the output signal AZRO. Bit slice BS2 also includes a half adder HA2 which adds the logic state on the active high output line B2 to the logic state on the active high carry input signal CI2. Half adder HA2, which is a type of adder, also generates an active high sum output PR2 and an active low carry output CI3Z.

Most significant bit slice BS3 includes an inverter IN15 and a transmission gate T11. Inverter IN15 has an input connected to receive coefficient bit C2 and an output, while transmission gate T11 has an input connected to the output of inverter IN15 and an output connected to active low output line B3Z. Furthermore, transmission gate T11 has an n-channel gate connected to receive control signal A2X and a p-channel gate connected to receive control signal A2XZ.

Bit slice BS3 also includes a transmission gate T12 which has an input connected to receive coefficient bit C2, and an output connected to active low output line B3Z. Transmission gate T12 has an n-channel gate connected to receive control signal S2X and a p-channel gate connected to receive control signal S2XZ.

Furthermore, bit slice BS3 also includes an inverter IN16 and a transmission gate T13. Inverter IN16 has an input connected to receive coefficient bit C2 and an output, while transmission gate T13 has an input connected to the output of inverter IN16 and an output connected to active low output line B3Z. Transmission gate T13 has an n-channel gate connected to receive control signal A1X and a p-channel gate connected to receive control signal A1XZ.

Bit slice BS3 also includes a transmission gate T14 which has an input connected to receive coefficient bit C2, and an output connected to active low output line B3Z. Transmission gate T14 has an n-channel gate connected to receive control signal S1X and a p-channel gate connected to receive control signal S1XZ.

Furthermore, bit slice BS3 also includes a p-channel transistor M6 which has a source connected to the power supply voltage, a drain connected to active low output line B3Z, and a gate connected to output OUT11 of controller 110 (signal AZROZ). Bit slice BS3 also includes a half adder HA3 which adds the logic state on the active low output line B3Z to the logic state on the active low carry input CI3Z. Half adder HA3, which is a type of adder, also generates an active high sum output PR3.

As an example of the operation of bit slices BS0–BS3, assume that the multiplier is equal to +2. This causes the multiplicand to be left shifted and added to zero. Thus, when decoded, a +2 multiplier causes the control signal A2X to become high and the inverse control signal A2XZ to become low. Control signal A2X turns on transistor M0, thereby causing the signal on line B0 to have a logic low.

Control signals A2X and A2XZ also turn on transmission gates T3, T7, and T11. This causes the value on line C0 to be inverted and passed onto output line B1Z, the value on line C1 to be passed onto output line B2, and the value on line C2 to be inverted and passed onto output line B3Z. The values on output lines B0, B1Z, B2, and B3Z are then added to zero by half adders HA0–HA3. The resulting sum drives outputs PR0–PR3.

As shown in FIG. 2, the least significant bit slice BS0 generates an active high signal on line B0 which drives half adder HA0. Similarly, odd bit slice BS1 generates an active low signal on line B1Z which drives half adder HA1. Furthermore, even bit slice BS2 generates an active high signal on line B2 which drives half adder HA2. And finally, the most significant bit slice BS3 generates an active low signal on line B3Z which drives half adder HA3. (Half adder HA3 is a simplified half adder implemented as an XOR gate. A simplified half adder can be used because the most significant bit slice BS3 does not have to generate a carry output.)

As shown in FIGS. 1 and 2, the carry propagation path contains an alternating sequence of active high and active low carry signals. Thus bit slice BS0 has an active high carry input CYIN and an active low carry output CI1Z. Similarly, bit slice BS1 has an active low carry input CI1Z and an active high carry output CI2. Furthermore, bit slice BS2 has an active high carry input CI2 and an active low carry output CI3Z. And finally, BS3 has an active low carry input CI3Z and no carry output.

The alternating polarity of the carry signals significantly speeds up the total carry propagation time because each bit slice adds only one inversion to the carry propagation chain. Thus, if the polarity of the carry signals was not alternated, each bit slice would add two inversions to the carry propagation chain, instead of one. This would increase the total carry propagation time by a factor of two.

As shown in FIGS. 1 and 2, except for the active high/active low polarity of the B1Z/B2 signals, the odd bit slice and the even bit slice are almost identical. Thus each odd/even bit slice receives the same five control signals and their complements (A2X/A2XZ, S2X/S2XZ, A1X/A1XZ, S1X/S1XZ and AZRO/AZROZ). Furthermore, since the control signals are mutually exclusive, only one of them (and its complement) can be active, depending upon the value of the multiplier bits (D2, D1, D0).

To perform multiplication correctly, the following decisions must be made: Should the multiplicand (C2, C1, C0) be shifted left? Should the multiplicand (C2, C1, C0) be inverted? What value should be forced onto the B0 line in the least significant bit slice (BS0)? What value should be forced onto B3, the active high equivalent of the active low B3Z signal? (This signal affects the value of the most significant product bit, PR3). Should the carry input (CYIN) be forced high or forced low?

For each multiplier value, the answers to the foregoing questions are summarized in TABLE 4:

TABLE 4

| Multiplier Value | Active Control Signal | Shift Mcand Left? | Invert Mcand? | Force LSB (B0) To | Force B3 To | Force CYIN To |
|---|---|---|---|---|---|---|
| +2 | A2X | Y | N | 0 | C2 | 0 |
| −2 | S2X | Y | Y | 1 | ~C2 | 1 |
| +1 | A1X | N | N | C0 | C2 | 0 |
| −1 | S1X | N | Y | ~C0 | ~C2 | 1 |
| 0 | AZRO | N | N | 0 | 0 | 0 |

Referring to FIG. 1, the odd/even bit slices essentially multiplex the multiplicand bits (C2, C1, C 0) onto the B0, B1Z, B2 and B3Z lines. Thus, five mutually exclusive multiplex paths are provided, corresponding to the five possible values of the multiplier (+2, −2, +1, −1, 0). For the even bit slice BS2, the five multiplex paths are shown in TABLE 5 below:

TABLE 5

| Multiplier Value | Active Control Signal | Multiplexed Data |
|---|---|---|
| +2 | A2X | Mux (pass) the previous multiplier bit C1 onto line B2 |
| −2 | S2X | Invert and mux (pass) the previous multiplier bit C1 onto line B2 |
| +1 | A1X | Mux (pass) the current multiplier bit C2 onto line B2 |
| −1 | S1X | Invert and mux (pass) the current multiplier bit C2 onto line B2 |
| 0 | AZRO | Mux (force) the logic zero level onto line B2 |

Similarly, for the odd bit slice BS1, the five multiplex paths are shown in TABLE 6 below:

TABLE 6

| Multiplier Value | Active Control Signal | Multiplexed Data |
|---|---|---|
| +2 | A2X | Invert and mux (pass) the previous multiplier bit C0 onto line B1Z |
| −2 | S2X | Mux (pass) the previous multiplier bit C0 onto line B1Z |
| +1 | A1X | Invert and mux (pass) the current multiplier bit C1 onto line B1Z |
| −1 | S1X | Mux (pass) bit the current multiplier bit C1 onto line B1Z |
| 0 | AZRO | Mux (force) the logic one level onto line B1Z |

Referring to TABLE 6 above, the AZRO signal forces a logic one level, instead of a logic zero level, because the B1Z signal is active low instead of active high. Thus forcing a logic one on B1Z is really equivalent to forcing a logic zero on B1, the active high equivalent of the active low B1Z.

For the most significant bit slice BS3, the five multiplex paths are shown in TABLE 7 below:

TABLE 7

| Multiplier Value | Active Control Signal | Multiplexed Data |
| --- | --- | --- |
| +2 | A2X | Invert and mux (pass) the previous multiplier bit C2 onto line B3Z |
| −2 | S2X | Mux (pass) the previous multiplier bit C2 onto line B3Z |
| +1 | A1X | Invert and mux (pass) the previous multiplier bit C2 onto line B3Z |
| −1 | S1X | Mux (pass) the previous multiplier bit C2 onto line B3Z |
| 0 | AZRO | Mux (force) the logic one level onto line B3Z |

Referring to TABLE 7 above, the AZRO signal forces a logic one level, instead of a logic zero level, because the B3Z signal is active low instead of active high. Thus forcing a logic one on B3Z is really equivalent to forcing a logic zero on B3, the active high equivalent of the active low B3Z.

Figure 3:
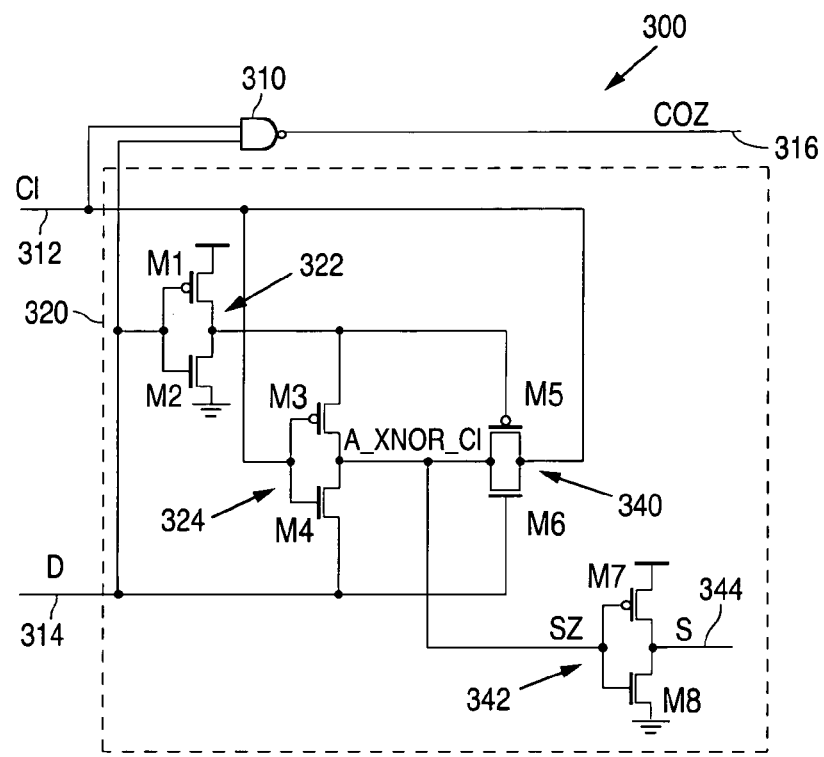
FIG. 3 is a circuit schematic illustrating a half adder 300 with active high inputs and an active low carry output in accordance with the present invention.

In accordance with the present invention, FIG. 3 shows the circuit schematic for a half adder 300 which has an active high carry input and an active low carry output. Referring to FIG. 2, half adders HA0 and HA2 can be implemented using half adder 300. As shown in FIG. 3, half adder 300 includes a carry NAND gate 310 and a sum circuit 320.

NAND gate 310 has an input connected to receive an active high carry signal CI on an input 312, an input connected to receive an active high data signal D on an input 314, and an output which generates an active low carry output signal COZ onto output 316. NAND gate 310 generates a logic low only when both the input carry signal CI and the input data signal D are both high.

Sum circuit 320 includes an inverter 322 which has an input connected to 314, an output, and an inverter 324 which has an input connected to 312, and an output. Inverter 324 has a power input connected to the output of inverter 322, and a ground input connected to input 314.

Furthermore, sum circuit 320 also includes a transmission gate 340 which has an input connected to input 312, and an output connected to the output of inverter 324. Transmission gate 340 also has a p-channel gate connected to the output of inverter 322, and an n-channel gate connected to input 314. Furthermore, sum circuit 320 also includes an inverter 342 which has an input connected to the output of inverter 324, and a sum output connected to output 344.

In operation, half adder 300 adds the carry input signal CI and the data input signal D, generating a sum output signal S (on output PR0 for example) and an active low carry output signal COZ. For example, assume that a logic high is present on inputs 312 and 314. In this case, NAND gate 310 generates an active low carry output signal COZ. Furthermore, the logic high on input 314 forces a logic low at the output of inverter 322 and a logic high on the source of n-channel transistor M4. This turns off inverter 324 and turns on transmission gate 340. As a result, the logic high on input 312 passes to the input of inverter 342, which then outputs a logic low on output 344. A logic low on output 344 and a logic low on the active low carry output signal COZ correctly represent the addition of a logic one and a logic one.

Figure 4:
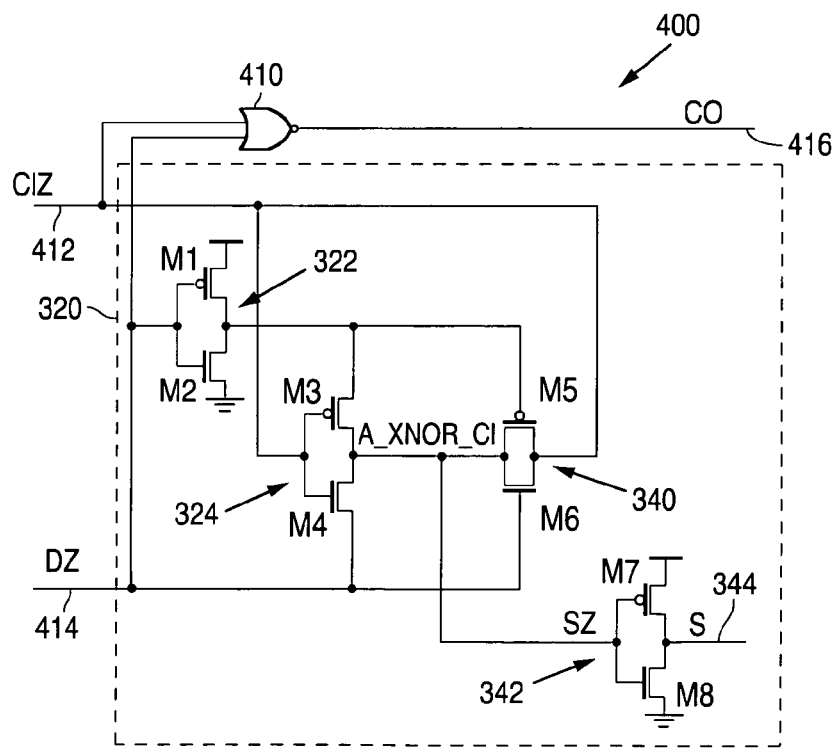
FIG. 4 is a schematic drawing illustrating a half adder 400 with active low inputs and an active high carry output in accordance with the present invention.

FIG. 4 shows a schematic drawing which illustrates a half adder 400 with active low inputs and active high outputs in accordance with the present invention. Half adder HA1 can be implemented using half adder 400. (Half adder HA3 can also be implemented with half adder 400. As noted above, however, a simplified version of adder 400 can also be used.) As shown in FIG. 4, half adder 400 includes sum circuit 320 from FIG. 3, and a carry NOR gate 410.

Thus, half adders 300 and 400 use the same sum circuit 320. This is allowed because sum circuit 320 implements the XOR function of the two half adder inputs, and the XOR function remains unchanged when both of its inputs are inverted.

Gate 410 has an input connected to receive an active low carry signal CIZ on an input 412, an input connected to receive an active low inverted data signal DZ on an input 414, and an output which generates an active high carry output signal CO at output 416. Gate 410 generates a logic high only when both the carry signal CIZ and the inverted data signal DZ are both low.

In operation, half adder 400 adds the active low carry input signal CIZ and the active low data input signal DZ, generating an active high sum output signal S and an active high carry output signal CO. Since input signals CIZ and DZ are both active low, a logic zero on inputs 412 and 414 is equivalent to a logic high on inputs 312 and 314.

For example, assume that a logic low is present on inputs 412 and 414. In this case, NOR gate 410 generates an active high carry output CO. Furthermore, the logic low on input 414 forces the output of inverter 322 to become high. This turns off transmission gate 340 and turns on inverter 324. As a result, the logic low on input 412 is inverted by inverter 324 to form a logic high, which is then inverted by inverter 342, generating a logic low on the sum output 344. A logic low on the sum output 344 and a logic high on the carry output CO correctly represent the addition of a logic one (active low) and a logic one (active low).

Half adders 300 and 400 generate the carry output by a single two-input NAND gate or a single two-input NOR gate. Thus, for both half adders, the carry signal must only propagate through a single inversion. As previously discussed, this decreases the carry propagation delay by a factor of two.

As shown in FIGS. 3 and 4, output 344 is buffered by inverter 342, consisting of transistors M7 and M8. Since the sum output S is an XOR function of the half adder inputs, the SZ input to inverter 342 must be the complement of the XOR function—i.e. the XNOR function. The XNOR circuit shown in FIGS. 3 and 4 is a low power or "compact" XNOR circuit which has only six transistors (M1–M6). This reduces power dissipation in comparison to a normal (higher power) XNOR circuit which contains at least 10 devices.

In addition, if the load on output 344 is small, buffer inverter 342 can be eliminated. In this case the low power XNOR circuit must then be complemented—i.e. replaced by an equivalent low power XOR circuit.

Figure 5:
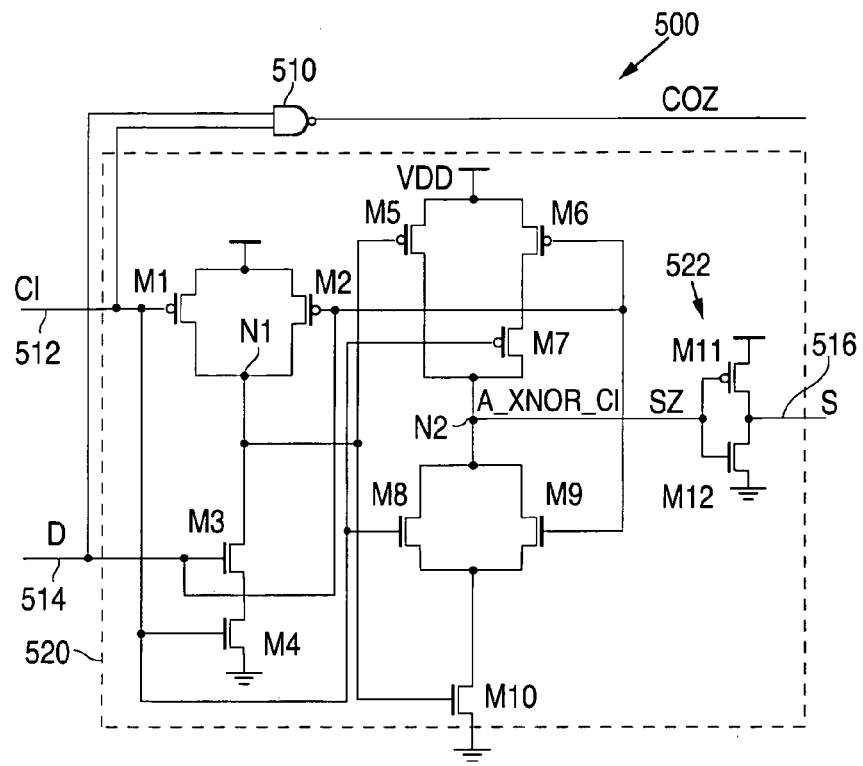
FIG. 5 is a circuit schematic illustrating a half adder 500 with active high inputs and an active low carry output in accordance with the present invention.

FIG. 5 shows a circuit schematic which illustrates a half adder 500 in accordance with the present invention. Half adder 500 has an active high carry input 512, an active high data input 514, an active low carry output COZ, and an active high sum output 516. Half adders HA0 and HA2 can be implemented using half adder 500. As shown in FIG. 5, half adder 500 includes a carry NAND gate 510 and a sum circuit 520.

NAND gate 510 has an input connected to receive an active high carry input signal CI on an input 512, an input connected to receive an active high data input signal D on an input 514, and an output which generates an active low carry output signal COZ. Gate 510 generates a logic low output only when both of its inputs (CI and D) are high.

Sum circuit 520 includes a first intermediate node N1 and a pair of p-channel transistors M1 and M2. Transistor M1 has a gate connected to input 512, a source connected to a power supply node, and a drain connected to intermediate node N1. Transistor M2 has a gate connected to input 514, a source connected to a power supply node, and a drain connected to intermediate node N1.

In addition, a pair of n-channel transistors, M3 and M4, are serially connected to intermediate node N1. Transistor M3 has a gate connected to input 514, a source, and a drain connected to intermediate node N1. Transistor M4 has a gate connected to input 512, a source connected to ground, and a drain connected to the source of transistor M3.

Transistor M1 passes a logic high to node N1 when the carry signal CI is a logic low, and transistor M2 passes a logic high to node N1 when the data signal D is a logic low. Furthermore, transistors M3 and M4 pass a logic low to node N1 only when the carry signal CI and the data signal D are both a logic high.

Sum circuit 520 also includes three p-channel transistors M5, M6, and M7. Transistor M5 has a gate connected to node N1, a source connected to a power supply node, and a drain connected to a second intermediate node N2. Transistor M6 has a gate connected to input 514, a source connected to a power supply node, and a drain. Transistor M7 has a gate connected to input 512, a source connected to the drain of transistor M6, and a drain connected to the second intermediate node N2.

In addition, sum circuit 520 also contains three n-channel transistors M8, M9, and M10. Transistor M8 has a gate connected to input 512, a source, and a drain connected to node N2. Transistor M9 has a gate connected to input 514, a source, and a drain connected to node N2. Transistor M10 has a gate connected to node N1, a source connected to ground, and a drain connected to the sources of transistors M8 and M9.

Furthermore, sum circuit 520 also includes an inverter 522, which includes transistors M11 and M12. Transistor M11 has a gate connected to intermediate node N2, a source connected to a power supply node, and a drain connected to output 516. Transistor M12 has a gate connected to intermediate node N2, a source connected to ground, and a drain connected to output 516.

In operation, half adder 500 adds the logic state of the active high carry input CI and the logic state of the active high data input D, generating an active high data output S and an active low carry output COZ. NAND gate 510 generates the active low carry output COZ, the same as NAND gate 310, while sum circuit 520 performs the sum operation.

For example, assume that a logic high is present on inputs 512 and 514. In this case, NAND gate 510 outputs an active low carry signal COZ, transistors M1, M2, M6 and M7 turn off, and transistors M3 and M4 turn on. When transistors M3 and M4 turn on, the gate of transistor M5 and the gate of transistor M10 are pulled to ground. This places a logic high on the input of inverter 522, transferring a logic low to output 516.

Thus, sum circuit 520 performs the same addition operation as sum circuit 320. However, because sum circuit 520 requires 12 transistors, whereas sum circuit 320 only requires 8 transistors, sum circuit 520 consumes more power and requires more silicon area than sum circuit 320. Furthermore, sum circuit 520 contains 7 stacked transistors which must be made relatively large, increasing power dissipation and cell area. Sum circuit 320 does not require any stacked transistors.

Figure 6:
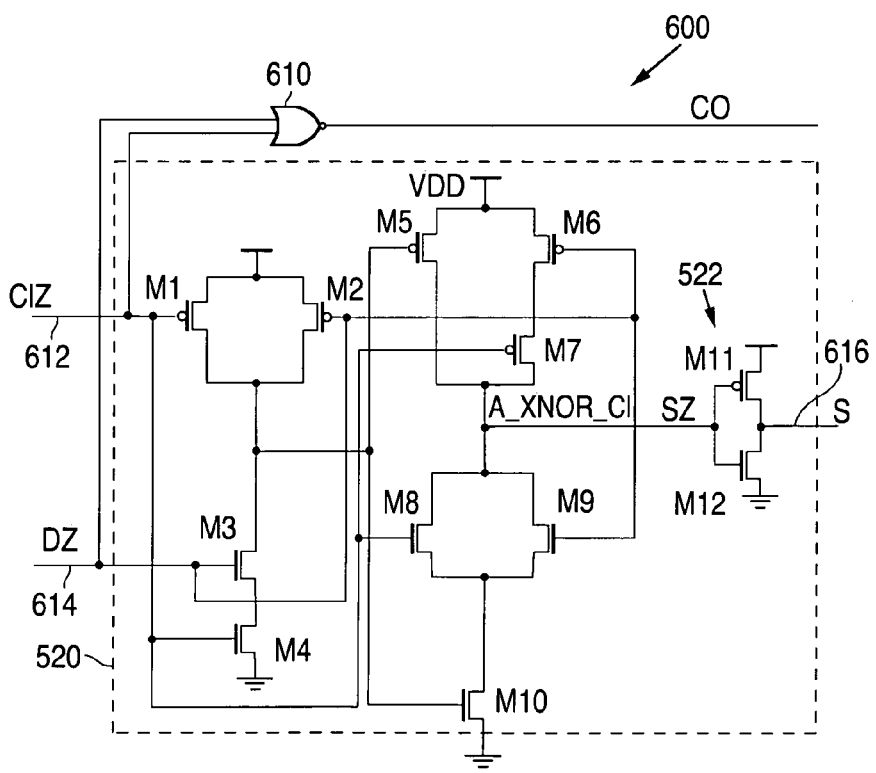
FIG. 6 is a schematic drawing illustrating a half adder 600 with active low inputs and an active high carry output in accordance with the present invention.

FIG. 6 shows a circuit schematic which illustrates a half adder 600 in accordance with the present invention. Half adder 600 has an active low carry input CIZ, an active low data input DZ, an active high sum output S and an active high carry output C0. Half adder HA1 can be implemented using half adder 600. (Although half adder HA3 can also be implemented with half adder 600, as previously noted above, a simplified version of half adder 600 can also be used.) As shown in FIG. 6, half adder 600 includes sum circuit 520 from FIG. 5 and a 2 input carry NOR gate 610, whose inputs are connected to inputs 612 and 614.

In operation, half adder 600 adds the active low carry input CIZ and the active low data input DZ, generating an active high sum output S and an active high carry output CO. NOR gate 610 generates a logic high only when inputs 612 and 614 are both zero. Since both of these inputs are active low, a logic zero on inputs 612 and 614 is equivalent to a logic high on inputs 512 and 514.

For example, assume that a logic low is present on inputs 612 and 614. In this case, NOR gate 610 generates an active high carry output CO. Furthermore, the logic low on inputs 612 and 614 turns off transistors M3, M4, M8, and M9, and turns on transistors M1, M2, M6, and M7. When transistors M6 and M7 turn on, their logic high output turns on inverter 522, transferring a logic low to output 616.

Figure 7:
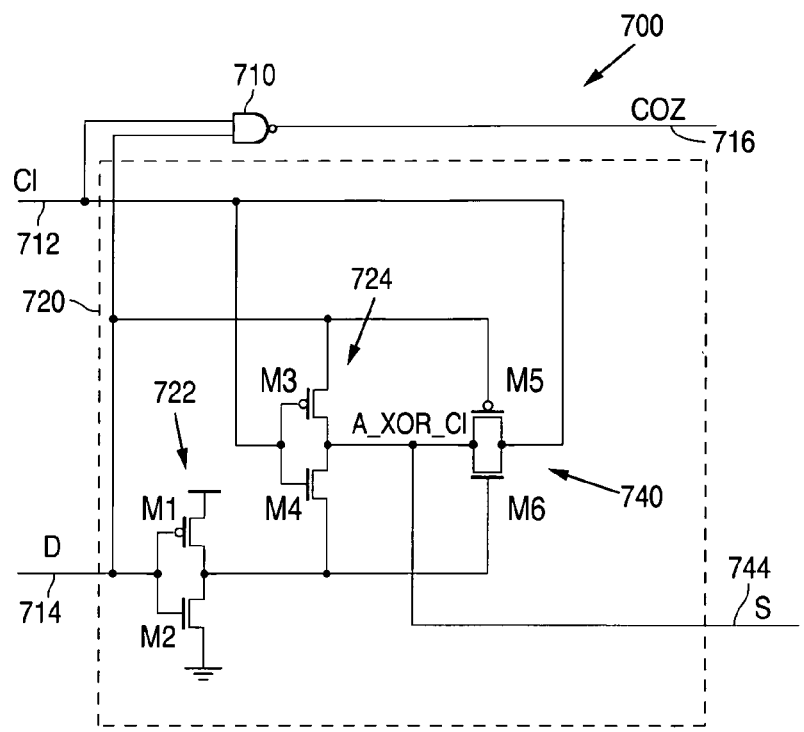
FIG. 7 is a circuit schematic illustrating a half adder 700 with active high inputs and an active low carry output in accordance with the present invention.

FIG. 7 shows a circuit schematic which illustrates a half adder 700 in accordance with the present invention. Half adder 700 has an active high carry input CI, an active high data input D, an active low carry output COZ and an active high sum output S. Half adders HA0 and HA2 can be implemented using half adder 700. As shown in FIG. 7, half adder 700 includes a carry NAND gate 710 and a sum circuit 720.

NAND gate 710 has an input connected to receive an active high carry signal CI on input 712, an input connected to receive an active high data signal D on input 714, and an output which generates an active low carry output COZ on output 716. NAND gate 710 generates an active low carry output only when its carry input CI and its data input D are both high.

Sum circuit 720 includes an inverter 722 which has an input connected to input 714, and an output. Sum circuit 720 also includes an inverter 724 which has an input connected to input 712, and an output. Inverter 724 also has a power input connected to input 714, and a ground input connected to the output of inverter 722.

Furthermore, sum circuit 720 also includes a transmission gate 740 which has an input connected to input 712, and an output connected to the output of inverter 724. Transmission gate 740 also has a n-channel gate connected to the output of inverter 722, and a p-channel gate connected to input 714.

In operation, half adder 700 adds the carry input CI and the data input D, generating an active high sum output S and an active low carry output COZ. For example, assume that a logic high is present on inputs 712 and 714. In this case, NAND gate 710 generates an active low carry output COZ. Furthermore, the logic high on input 714 forces a logic low at the output of inverter 722, turning off transmission gate 740 and turning on inverter 724. When inverter 724 turns on, its logic low output is passed on to the sum output 744.

Figure 8:
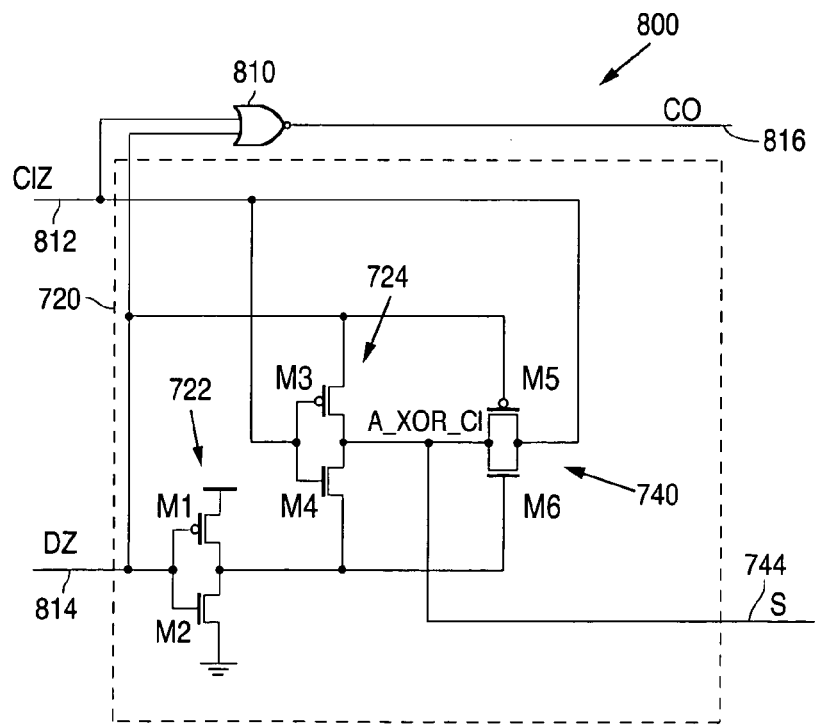
FIG. 8 is a schematic drawing illustrating a half adder 800 with active low inputs and an active high carry output in accordance with the present invention.

FIG. 8 shows a circuit schematic which illustrates a half adder 800 in accordance with the present invention. Half adder 800 has an active low carry input CIZ, an active low data input DZ, an active high carry output CO, and an active high sum output S. Half adder HA1 can be implemented using half adder 800. (Half adder HA3 can also be implemented with half adder 800. As noted above, however, a simplified version of half adder 800 can also be used). As shown in FIG. 8, half adder 800 includes sum circuit 720 from FIG. 7, and a carry NOR gate 810.

NOR gate 810 has an active low carry input signal CIZ on input 812, an active low data signal DZ on input 814, and an active high carry output signal CO on output 816. Thus NOR gate 810 will generate a logic high only when its carry input CIZ and its data input DZ are both low.

In operation, half adder 800 adds the active low carry signal CIZ and the active low data signal DZ, generating an active high sum output S and an active high carry output CO. Since the inputs to half adder 800 are both active low, a logic low on inputs 812 and 814 is equivalent to a logic high on inputs 712 and 714.

For example, assume that a logic low is present on inputs 812 and 814. In this case, NOR gate 810 generates an active high carry output CO. Furthermore, the logic low on input 814 forces a logic high at the output of inverter 722, turning on transmission gate 740 and turning off inverter 724. As a result, the logic low on input 812 is passed on to the sum output 744. A logic low on output 744 and a logic high on output CO correctly represent the addition of a logic one (active low) and a logic one (active low).

Half adders 700 and 800, which have an unbuffered sum output S, are implemented using a low power XOR circuit containing six transistors (M1–M6), the same number of transistors contained in the low power XNOR circuit shown in FIGS. 3 and 4. In addition, the low power XOR circuit shown in FIGS. 7 and 8 and the low power XNOR circuit shown in FIGS. 3 and 4 are almost identical. The only difference is that the M1/M2 inverter is connected in a different place.

Figure 9:
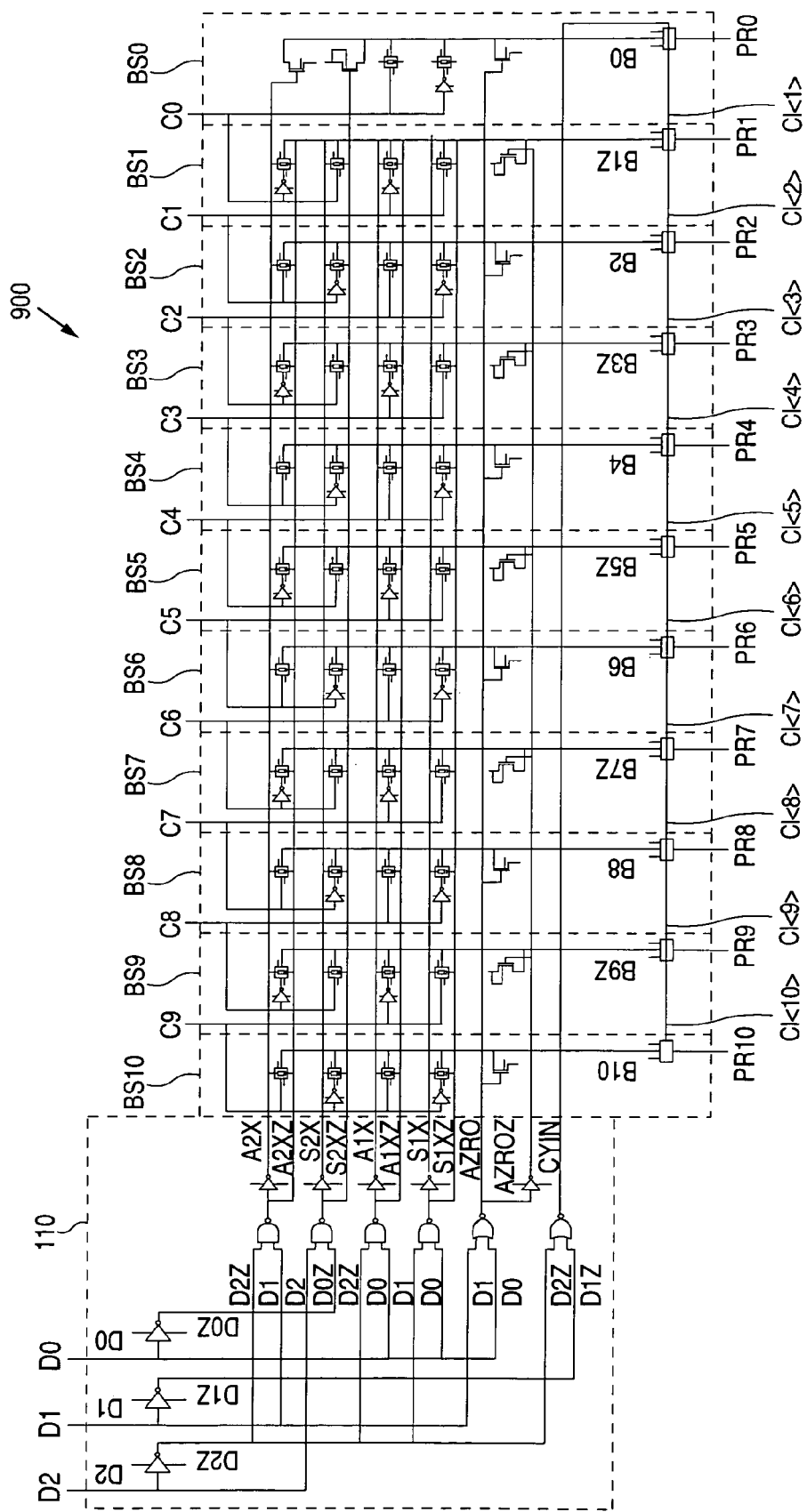
FIG. 9 is a schematic illustrating an example of a low power tap multiplier 900 in accordance with the present invention.

FIG. 9 shows an example of a low power tap multiplier 900 in accordance with the present invention. Tap multiplier 900 is similar to tap multiplier 100 and, as a result, utilizes the same reference numerals to designate the structures which are common to both multipliers. As shown in FIG. 9, tap multiplier 900 differs from tap multiplier 100 in that tap multiplier 900 receives a multiplicand C0–C9 which is ten bits in length. In the example shown in FIG. 9, the multiplicand is symmetric. As a result, the tap multiplier product PR0–PR10 contains 11 bits, one bit more than the number of bits in the multiplicand.

Figure 10:
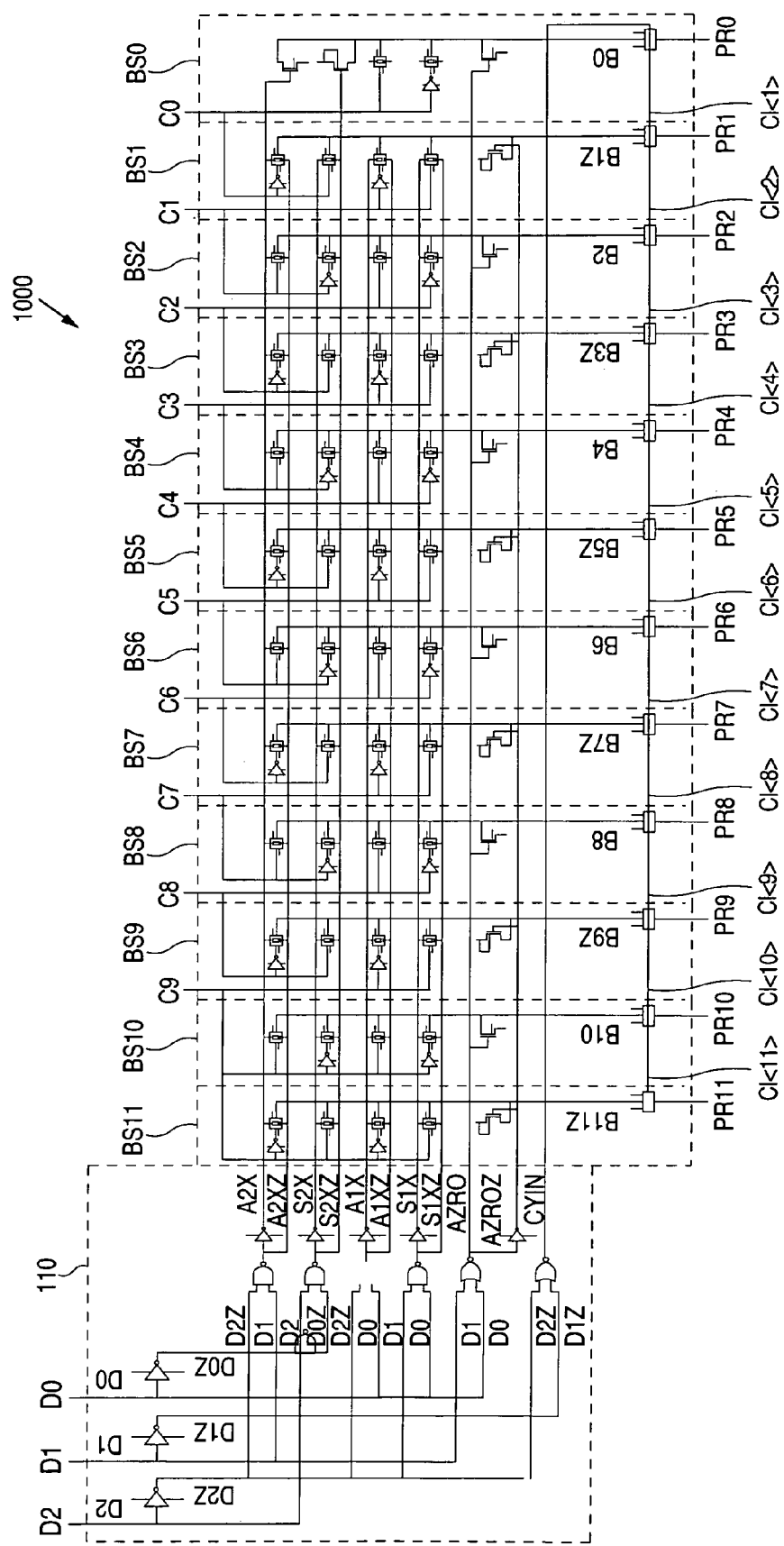
FIG. 10 is a schematic illustrating an example of a low power tap multiplier 1000 in accordance with the present invention.

FIG. 10 shows an example of a low power tap multiplier 1000 in accordance with the present invention. Tap multiplier 1000 is similar to tap multiplier 100 and, as a result, utilizes the same reference numerals to designate the structures which are common to both multipliers. As shown in FIG. 10, tap multiplier 1000 differs from tap multiplier 100 in that tap multiplier 1000 receives a multiplicand C0–C9 that is ten bits in length. In the example shown in FIG. 10, the multiplicand is non-symmetric. As a result, the tap multiplier product PR0–PR11 contains 12 bits, two bits more than the number of bits in the multiplicand.

In order to minimize power, all of the tap multiplier examples have employed a ripple carry scheme. However, when very high speed is required, the ripple carry approach will be too slow. For these cases, a carry look-ahead or carry bypass scheme can be employed. Of course, both of these advanced carry techniques will dissipate additional power.

The power savings provided by the low power tap multiplier of the present invention are very substantial in comparison to a conventional tap multiplier. For example, when the multiplicand is 8 bits in length, the power dissipation of the low power tap multiplier is only $\frac{1}{6}^{th}$ that of a conventional tap multiplier (assuming that both multipliers are operating at the same frequency, and driving the same load capacitances).

From a chip area standpoint, the low power tap multiplier of the present invention consumes approximately one half the area of a conventional tap multiplier. This area difference can easily amount to a very substantial savings in total chip area, since DSP chips often employ hundreds or even thousands of tap multipliers.

It should be understood that various alternatives to the invention described herein may be employed in practicing the invention. Thus, it is intended that the following claims define the scope of the invention and that methods and structures within the scope of these claims and their equivalents be covered thereby.

What is claimed is:

1. A multiplier for multiplying a m-bit multiplier and a n-bit multiplicand to produce a p-bit multiplication product, the multiplier comprising:
   a multiply controller that decodes the m-bit multiplier and outputs a plurality of control signals in response thereto; and
   a plurality of bit slices connected to the multiply controller, each bit slice having a plurality of processing blocks and an adder connected to the processing blocks, each processing block within a bit slice being connected to a control signal, a processing block within the bit slice being connected to a bit of the n-bit multiplicand, the adder within the bit slice outputting one bit of the p-bit multiplication product.

2. The multiplier of claim 1 wherein the plurality of bit slices is equal to the n-bit multiplicand plus one.

3. The multiplier of claim 1 wherein the plurality of bit slices is equal to the n-bit multiplicand plus two.

4. The multiplier of claim 1 wherein a least significant bit slice includes:
   a n-channel transistor having a gate connected to a first control signal, a source connected to ground, and a drain connected to the adder; and
   a p-channel transistor having a gate connected to a second control signal, a source connected to a power supply node, and a drain connected to the adder.

5. The multiplier of claim 4 wherein the least significant bit slice further includes:
   a first transmission gate connected to a third control signal and a bit of the n-bit multiplicand;
   an inverter connected to the bit of the n-bit multiplicand; and
   a second transmission gate connected to a fourth control signal and an output of the inverter.

6. The multiplier of claim 1 wherein the m-bit multiplier identifies only one control signal to be asserted.

7. The multiplier of claim 1 wherein the processing blocks in the bit slice include:
   a n-channel transistor having a gate connected to a first control signal, a source connected to ground, and a drain connected to the adder; and
   a p-channel transistor having a gate connected to a second control signal, a source connected to a power supply node, and a drain connected to the adder.

8. The multiplier of claim 7 wherein the processing blocks in the bit slice further includes:
a first transmission gate connected to a third control signal and a bit of the n-bit multiplicand;
an inverter connected to the bit of the n-bit multiplicand; and
a second transmission gate connected to a fourth control signal and an output of the inverter.

9. The multiplier of claim 1 wherein the processing blocks in the bit slice include:
a first transmission gate connected to a first control signal and a first bit of the n-bit multiplicand;
a first inverter connected to the first bit of the n-bit multiplicand; and
a second transmission gate connected to a second control signal and an output of the first inverter.

10. The multiplier of claim 9 wherein the processing blocks in the bit slice further includes:
a third transmission gate connected to a third control signal and a second bit of the n-bit multiplicand;
a second inverter connected to the second bit of the n-bit multiplicand; and
a fourth transmission gate connected to a fourth control signal and an output of the second inverter.

11. The multiplier of claim 1 wherein a first bit slice has a first adder and a second bit slice has a second adder,
the first adder having:
a first logic block having a first input connected to receive a carry in signal, a second input connected to receive a data signal, and an output that generates a carry out signal with a first active state; and
a first sum circuit connected to the first input and the second input, the first sum circuit outputting a product bit with a logic state that represents an addition of the logic states on the first and second inputs; and
the second adder having:
a second logic block having a third input connected to receive the carry out signal with the first active state, a fourth input, and an output that generates a carry out signal with a second active state; and
a second sum circuit connected to the third input and the fourth input, the second sum circuit outputting a product bit with a logic state that represents an addition of the logic states on the third and fourth inputs.

12. The multiplier of claim 1 wherein the adder in a least significant bit slice includes:
a first logic block having an input connected to a first input to receive an active high carry signal, an input connected to a second input to receive an active high data signal, and an output that generates an active low carry signal; and
a first sum circuit connected to the first input and the second input, the first sum circuit outputting a product bit with a logic state that represents an addition of the logic states of the active high carry and data signals.

13. The multiplier of claim 12 wherein the first sum circuit includes:
a first inverter having an input and an output, the input of the first inverter being connected to the second input;
a transmission gate connected to the output of the first inverter; and
a second inverter having an input and an output, the input of the second inverter being connected to the first input, the output of the second inverter being connected to the transmission gate.

14. The multiplier of claim 12 wherein the first sum circuit includes:
a differential pair having a first transistor connected to the first input and a second transistor connected to the second input;
a third transistor connected to the second input, the first transistor, and the second transistor; and
a fourth transistor connected to the first input and the third transistor.

15. The multiplier of claim 12 wherein the adder in an even bit slice includes:
a second logic block having an input connected to a third input to receive the active low carry signal, an input connected to a fourth input to receive an active low data signal, and an output that generates an active high carry signal; and
a second sum circuit connected to the third input and the fourth input, the second sum circuit outputting a product bit with a logic state that represents an addition of the logic states of the active low carry and data signals.

16. The multiplier of claim 15 wherein the first logic block is a NAND gate.

17. The multiplier of claim 16 wherein the second logic block is a NOR gate.

18. The multiplier of claim 15 wherein the multiply controller, for each control signal, outputs a corresponding inverted control signal.

19. The multiplier of claim 18 wherein the m-bit multiplier identifies only one control signal to be asserted, and one inverted control signal.

20. The multiplier of claim 15 wherein the first sum circuit has only six transistors.

21. The multiplier of claim 15 wherein the first sum circuit has only six transistors and a transmission gate.

22. The multiplier of claim 21 wherein the second sum circuit has only six transistors and a transmission gate.

* * * * *

UNITED STATES PATENT AND TRADEMARK OFFICE
CERTIFICATE OF CORRECTION

PATENT NO. : 6,981,013 B1
DATED : December 27, 2005
INVENTOR(S) : Pasqualini

It is certified that error appears in the above-identified patent and that said Letters Patent is hereby corrected as shown below:

Column 3,
Line 61, delete "SIX" and replace with -- S1X --.

Signed and Sealed this

Seventh Day of March, 2006

JON W. DUDAS
*Director of the United States Patent and Trademark Office*